(12) United States Patent
Zhu et al.

(10) Patent No.: US 9,705,883 B2
(45) Date of Patent: Jul. 11, 2017

(54) COMMUNICATIONS TERMINAL AND SYSTEM AND RIGHTS MANAGEMENT METHOD

(71) Applicant: ZTE Corporation, Shenzhen, Guangdong (CN)

(72) Inventors: Hong Zhu, Shenzhen (CN); Xin Jia, Shenzhen (CN)

(73) Assignee: ZTE Corporation, Shenzhen, Guangdong (CN)

(*) Notice: Subject to any disclaimer, the term of this patent is extended or adjusted under 35 U.S.C. 154(b) by 129 days.

(21) Appl. No.: 14/441,244

(22) PCT Filed: Jun. 19, 2013

(86) PCT No.: PCT/CN2013/077508
§ 371 (c)(1),
(2) Date: May 7, 2015

(87) PCT Pub. No.: WO2013/166999
PCT Pub. Date: Nov. 14, 2013

(65) Prior Publication Data
US 2015/0256546 A1   Sep. 10, 2015

(30) Foreign Application Priority Data
Nov. 15, 2012 (CN) .......................... 2012 1 0460377

(51) Int. Cl.
G06F 7/04       (2006.01)
G06F 15/16      (2006.01)
(Continued)

(52) U.S. Cl.
CPC ............ *H04L 63/101* (2013.01); *H04L 63/08* (2013.01); *H04W 12/08* (2013.01); *G06F 21/305* (2013.01);
(Continued)

(58) Field of Classification Search
CPC ..... H04L 63/08; H04L 63/0876; H04L 63/10; H04L 63/101; H04L 63/083; *H04L 12/2814* (2013.01); *H04L 63/083* (2013.01); *H04L 63/0876* (2013.01); *H04L 63/10* (2013.01); *H04W 12/06* (2013.01); *H04W 24/08* (2013.01); *H04W 84/12* (2013.01)

(56) References Cited

U.S. PATENT DOCUMENTS 8,594,628 B1* 11/2013 Schroeder ........... H04L 63/0846
                                                        370/331
9,166,949 B2* 10/2015 Kumar .................... H04L 63/02
(Continued)

FOREIGN PATENT DOCUMENTS

CN    1604523 A    4/2005
CN    1842000 A   10/2006
(Continued)

OTHER PUBLICATIONS

Supplementary European Search Report in European application No. 13787806.2, mailed on Oct. 12, 2015.
(Continued)

*Primary Examiner* — Jayesh Jhaveri
(74) *Attorney, Agent, or Firm* — Oppedahl Patent Law Firm LLC

(57) ABSTRACT

The present invention provides a communications terminal and system and a rights management method, comprising: setting a rights list; listing unique identification information of user identity of each mobile terminal device that is allowed to access to the WiFi hot spot communications terminal; the communications terminal performing authentication on unique identification information in a mobile terminal authentication request; and establishing a connection. It is made convenient for the communications terminal to effectively manage access rights, and the management
(Continued)

becomes simpler and easier to operate. Meanwhile, the communications terminal performs authentication on the unique identification information of the user identity, thereby making the authentication process more efficient and improving the security of the authentication process. Meanwhile, priorities of the access rights of users are set, so as to ensure that a user of a high priority has preferential access, thereby making the access rights management more user-friendly.

13 Claims, 2 Drawing Sheets

(51) Int. Cl.
*G06F 17/30* (2006.01)
*H04L 29/06* (2006.01)
*H04W 12/08* (2009.01)
*H04L 12/28* (2006.01)
*H04W 24/08* (2009.01)
*G06F 21/30* (2013.01)
*H04W 84/12* (2009.01)
*H04W 12/06* (2009.01)

(58) Field of Classification Search
CPC .... H04L 12/2814; H04L 29/06; H04W 12/08; H04W 24/08; G06F 21/305; G06F 7/04; G06F 15/16; G06F 17/30
See application file for complete search history.

(56) References Cited

U.S. PATENT DOCUMENTS

| | | | | |
|---|---|---|---|---|
| 2007/0190974 A1* | 8/2007 | Zhang | ............... | H04L 63/08 455/411 |
| 2008/0026724 A1* | 1/2008 | Zhang | ............... | H04L 63/08 455/411 |
| 2010/0107225 A1 | 4/2010 | Spencer | | |
| 2011/0298596 A1* | 12/2011 | Warrick | ............... | G06F 21/305 340/12.53 |
| 2012/0082148 A1* | 4/2012 | Sperling | ............... | G06Q 30/04 370/338 |
| 2012/0083256 A1 | 4/2012 | Sperling | | |
| 2012/0084187 A1 | 4/2012 | Sperling | | |
| 2012/0094633 A1 | 4/2012 | Parsons | | |
| 2012/0227097 A1 | 9/2012 | Nakhjiri | | |
| 2013/0288676 A1 | 10/2013 | Parsons et al. | | |
| 2013/0322329 A1* | 12/2013 | Visuri | ............... | H04W 48/16 370/328 |
| 2014/0134980 A1* | 5/2014 | Singh | ............... | H04L 9/3263 455/411 |

FOREIGN PATENT DOCUMENTS

| | | |
|---|---|---|
| CN | 101039240 A | 9/2007 |
| CN | 102308622 A | 1/2012 |
| CN | 102638797 A | 8/2012 |
| GB | 2470243 A | 11/2010 |
| WO | 2008148191 A2 | 12/2008 |
| WO | 2012037161 A2 | 3/2012 |
| WO | 2012119015 A1 | 9/2012 |

OTHER PUBLICATIONS

International Search Report in international application No. PCT/CN2013/077508, mailed on Sep. 12, 2013.
English Translation of the Written Opinion of the International Search Authority in international application No. PCT/CN2013/077508, mailed on Sep. 12, 2013.

* cited by examiner

COMMUNICATIONS TERMINAL AND SYSTEM AND RIGHTS MANAGEMENT METHOD

TECHNICAL FIELD

The disclosure relates to the field of communication, and more particularly to a communication User Equipment (UE), communication system, and method for authorization management.

BACKGROUND

A mobile communication UE, especially a smart phone, has a built-in hot spot function. in enabling a hot spot, various modes of authentication such as OPEN-NONE, Wi-Fi Protected Access with a pre-shared key WPAPSK, or the like may be chosen. With the OPEN-NONE, another user is not required to enter a password to access the hot spot, which is convenient but hard to manage, thus susceptible to traffic theft. With encryption-authentication modes such as the WPAPSK, there is likewise a risk of password leakage, in addition to a cumbersome access process.

An existing WiFi (wireless fidelity, 802.11b protocol) chip typically serves for basic access management such as access authorization, limiting a total number of accessing clients, etc. For example, in access authorization, also commonly known as the blacklist/whitelist function, when a whitelist is enabled, only a user in the whitelist is allowed to access the hot spot; when a blacklist is enabled, a user in the blacklist is not allowed to access the hot spot. However, in bottom-layer implementation of the WiFi blacklist/whitelist, a Media Access Control (MAC) address serves as an identifier; while a mobile UE as a hot spot features portability and mobility, with a random and unpredictable accessing user, such that it is difficult to acquire and manage a MAC address. Thus, enabling a hot-spot MAC-based blacklist/whitelist function on a mobile communication UE poses poor usability and complicated management for common users. Thus, there is a pressing need for a secure stable method for authorization management that is easy to manage and simple to operate.

SUMMARY

Embodiments herein provide a communication UE, communication system, and method for authorization management, capable of managing authorization of access by a WiFi mobile device properly and effectively.

To this end, a technical solution herein is implemented as follows.

A method for authorization management includes:

receiving, by a communication User Equipment (UE), a WiFi authentication request sent by a mobile UE requesting access of the communication UE, the WiFi authentication request including unique identification information for identifying a current user of the mobile UE requesting access, the communication UE being a WiFi hot spot; and authenticating, by the communication UE, the mobile UE requesting access according to the WiFi authentication request and an authorized list, the authorized list including unique identification information for identifying a mobile UE user authorized to access the communication UE.

The authenticating, by the communication UE, the mobile UE requesting access according to the WiFi authentication request and an authorized list may include: determining, by the communication UE, whether the unique identification information in the WiFi authentication request is included in the authorized list, and determining that the mobile UE requesting access is authenticated for access when the unique identification information in the WiFi authentication request is included in the authorized list.

The WiFi authentication request may further include a current Media Access Control (MAC) address of the mobile UE requesting access, and the method may further include: after the mobile UE requesting access is authenticated for access, connecting, by the communication UE, to the mobile UE requesting access according to the current MAC address in the WiFi authentication request.

The authorized list of the communication UE may further include a last MAC address used in last accessing the communication UE by a user. The connecting, by the communication UE, to the mobile UE requesting access according to the current MAC address in the WiFi authentication request may include: determining whether the current MAC address of the mobile UE requesting access is included in the authorized list; when the current MAC address of the mobile UE requesting access is included in the authorized list and the current MAC address is identical to the last MAC address corresponding to the current user of the mobile UE requesting access, directly connecting to the mobile UE requesting access according to the current MAC address; when the current MAC address is not identical to the last MAC address, updating, with the current MAC address, the last MAC address used by the current user in the authorized list, and connecting to the mobile UE requesting access according to the current MAC address; when the current MAC address of the mobile UE requesting access is not included in the authorized list, adding the current MAC address of the mobile UE requesting access to the authorized list and connecting to the mobile UE requesting access according to the current MAC address.

The communication UE may clear any MAC address corresponding to a mobile UE in the authorized list when the communication UE turns on or off WiFi.

The unique identification information of a user may be a card number of a SIM card or a USIM card of the user, or an Email account bound to a mobile UE of the user.

The method may further include:

selecting contact information from an address book of the communication UE and importing the selected contact information to the authorized list, or adding contact information to the authorized list in a manual mode, the contact information including a name of a contact and unique identification information of the contact;

setting priorities in accessing the communication UE respectively for contacts in the authorized list.

The method may further include: after the communication UE authenticates the mobile UE requesting access according to the WiFi authentication request and the authorized list, determining, by the communication UE, whether a number of mobile UEs currently accessing the communication UE has reached an allowed maximal number of mobile UEs accessing the communication UE;

when the number of mobile UEs currently accessing the communication UE has not reached the allowed maximal number of mobile UEs accessing the communication UE, connecting, by the communication UE, to the mobile UE requesting access according to a current Media Access Control (MAC) address of the mobile UE requesting access;

when the number of mobile UEs currently accessing the communication UE has reached the allowed maximal number of mobile UEs accessing the communication UE, determining, by the communication UE according to the priorities in accessing the communication UE respectively for the contacts in the authorized list, whether a priority corresponding to the mobile UE requesting access is higher than a priority corresponding to a mobile UE currently accessing the communication UE; when there is a mobile UE currently accessing the communication UE with a priority lower than the priority corresponding to the mobile UE requesting access, disconnecting the mobile UE currently accessing the communication UE with the low priority, and connecting to the mobile UE requesting access; when there is no mobile UE currently accessing the communication UE with a priority lower than the priority corresponding to the mobile UE requesting access, refusing access by the mobile UE requesting access.

The method may further include: after the mobile UE requesting access is authenticated for access, and before connecting to the mobile UE requesting access, performing, by the communication UE, password authentication on the mobile UE requesting access.

A communication User Equipment (UE) serving as a WiFi hot spot may include a receiving module and an authenticating module. The receiving module is configured for receiving a WiFi authentication request sent by a mobile UE requesting access of the communication UE, The WiFi authentication request includes unique identification information for identifying a current user of the mobile UE requesting access. The authenticating module is configured for authenticating the mobile UE requesting access according to the WiFi authentication request and an authorized list. The authorized list includes unique identification information for identifying a mobile UE user authorized to access the communication UE.

The authenticating module may include a first determining unit and a listing unit. The first determining unit may be configured for determining whether the unique identification information in the WiFi authentication request is included in the authorized list.

The WiFi authentication request may further include a current Media Access Control (MAC) address of the mobile UE requesting access. The communication UE may further include a working module. The working module may be configured for: after the mobile UE requesting access has been authenticated by the authenticating module, connecting the communication UE to the mobile UE requesting access according to the current MAC address of the mobile UE requesting access.

The authenticating module may further include a second determining unit and a listing unit. The authorized list saved by the listing unit may further include a last MAC address used in last accessing the communication UE by a user. The second determining unit may be configured for: determining whether the current MAC address of the mobile UE requesting access is included in the authorized list. When the current MAC address of the mobile UE requesting access is included in the authorized list and the current MAC address is identical to the last MAC address corresponding to the current user of the mobile UE requesting access, the working module may be notified to connect to the mobile UE requesting access according to the current MAC address. When the current MAC address is not identical to the last MAC address, the last MAC address used by the current user in the authorized list may be updated with the current MAC address, and the working module may be notified to connect to the mobile UE requesting access according to the current MAC address. When the current MAC address of the mobile UE requesting access is not included in the authorized list, the listing unit may be notified to add the current MAC address of the mobile UE requesting access to the authorized list, and the working module may be notified to connect to the mobile UE requesting access according to the current MAC address. The listing unit may be configured for saving the authorized list, and adding or updating a MAC address of a mobile UE of a user in the authorized list.

The listing unit may be further configured for clearing any MAC address corresponding to a mobile UE of a user in the authorized list when WiFi is turned on or off.

The unique identification information of a user may be a card number of a SIM card or a USIM card of the user, or an Email account bound to a mobile UE of the user.

The listing unit in the authenticating module may be further configured for: selecting contact information from an address book of the communication UE and importing the selected contact information to the authorized list, or adding contact information to the authorized list in a manual mode. The contact information may include a name of a contact and unique identification information of the contact. The listing unit may be further configured for setting priorities in accessing the communication UE respectively for contacts in the authorized list.

The authenticating module may further include a third determining unit and a fourth determining unit. The third determining unit may be configured for: after the mobile UE requesting access is authenticated for access, determining whether a number of mobile UEs currently accessing the communication UE has reached an allowed maximal number of mobile UEs accessing the communication UE. When the number of mobile UEs currently accessing the communication UE has not reached the allowed maximal number of mobile UEs accessing the communication UE, the working module may be notified to connect the communication UE to the mobile UE requesting access. When the number of mobile UEs currently accessing the communication UE has reached the allowed maximal number of mobile UEs accessing the communication UE, an ON command may be sent to the fourth determining unit. The fourth determining unit may be configured for: after receiving the ON command, determining whether a priority corresponding to the mobile UE requesting access is higher than a priority corresponding to a mobile UE currently accessing the communication UE. When there is a mobile UE currently accessing the communication UE with a priority lower than the priority corresponding to the mobile UE requesting access, the working module may be notified to disconnect the mobile UE currently accessing the communication UE with the low priority, and connect the communication UE to the mobile UE requesting access. When there is no mobile UE currently accessing the communication UE with a priority lower than the priority corresponding to the mobile UE requesting access, the working module may be notified to refuse access by the mobile UE requesting access.

The authenticating module may further include a password authentication unit. The password authentication unit may be configured for: after the mobile UE requesting access is authenticated for access, performing password authentication on the mobile UE requesting access.

A communication system may include at least one mobile User Equipment (UE) and an aforementioned communication UE. The mobile UE may have a WiFi function, and send the communication UE a WiFi authentication request including unique identification information for identifying a user.

Advantages of the disclosure are as follows. A communication UE, communication system, and method for authorization management are provided. An authorized list listing unique identification information for identifying any mobile UE user authorized to access the communication UE serving as a WiFi hot spot is set, implementing effective, simple, easy-to-operate access authorization management by the communication UE. Furthermore, the communication UE authenticates unique identification information for identifying a user, leading to more efficient and secure authentication.

In addition, a priority for accessing the communication UE by a user is set, ensuring that a user with a high priority can access the communication UE first, allowing more user-friendly access authorization management.

Meanwhile, in addition to authentication of unique identification information for identifying a user of a mobile UE requesting access, password authentication may further be performed on the mobile UE requesting access, thereby improving security during authentication, reducing occurrence of network pirating.

DETAILED DESCRIPTION

Figure 1:
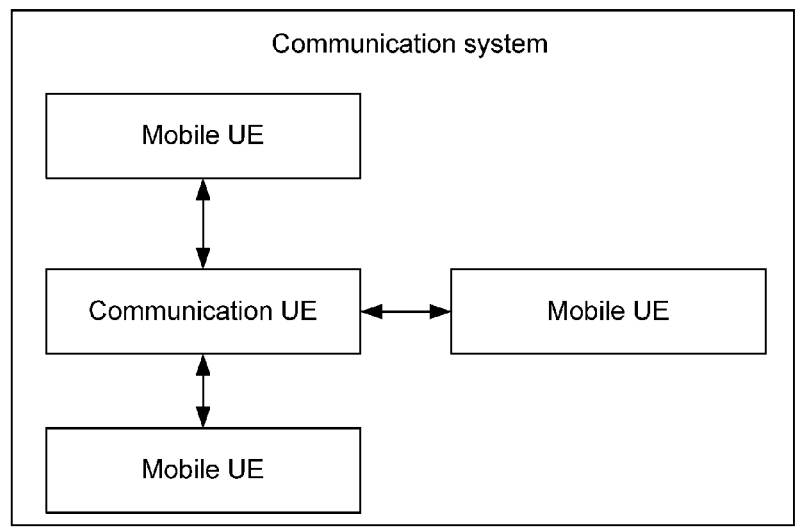
FIG. 1 is a schematic diagram of a structure of a communication system according to an embodiment herein.

According to embodiments herein, an authorized list for user authorization management is set in a communication UE as a WiFi hot spot; unique identification information for identifying a user authorized to access the communication UE is stored in the authorized list; the communication UE receives a WiFi authentication request sent by a mobile UE requesting to access the communication UE; the WiFi authentication request may include unique identification information for identifying a current user of the mobile UE requesting access, the communication UE compares the unique identification information for identifying the current user of the mobile UE requesting access with the unique identification information in the authorized list set in the communication UE; when the unique identification information for identifying the current user of the mobile UE requesting access matches the unique identification information in the authorized list, a current MAC address of the mobile UE requesting access is extracted, and the mobile UE requesting access is connected to the communication UE according to the extracted current MAC address; when it is the first time that the mobile UE requesting access requests connection, the current MAC address in the WiFi authentication request is extracted directly for establishing the connection, and the extracted current MAC address is saved in the authorized list; when the mobile UE requesting access has previously logged in (from a last MAC address), the current MAC address is compared with the last MAC address; when the current MAC address is identical to the last MAC address, the mobile UE requesting access is connected to the communication UE directly according to the current MAC address; when the current MAC address is not identical to the last MAC address, the last MAC address in the authorized list is updated with the current MAC address, and the mobile UE requesting access is connected to the communication UE according to the current MAC address. In the disclosure, priorities may be set respectively for contacts in the authorized list as needed by a user to ensure that a user with a high priority can access the communication UE in time. The communication UE serving as a WiFi hot spot herein may be various devices with a built-in WiFi hot spot function, or a device capable of establishing a WiFi hot spot by means of an external device, a common example of which may be a desktop, a mobile UE, a tablet computer, a television set, etc. The mobile UE requesting access may further be such a device as described above. The mobile UE requesting access may be a mobile telephone. The unique identification information of a user thereof may be a card number of a SIM card or a USIM card in the mobile UE requesting access, an Email account bound to a mobile UE of the user, or other information capable of uniquely identifying the user. In order to clearly show a technical solution herein and advantages thereof, the disclosure is elaborated below with reference to embodiments and drawings.

Figure 2:
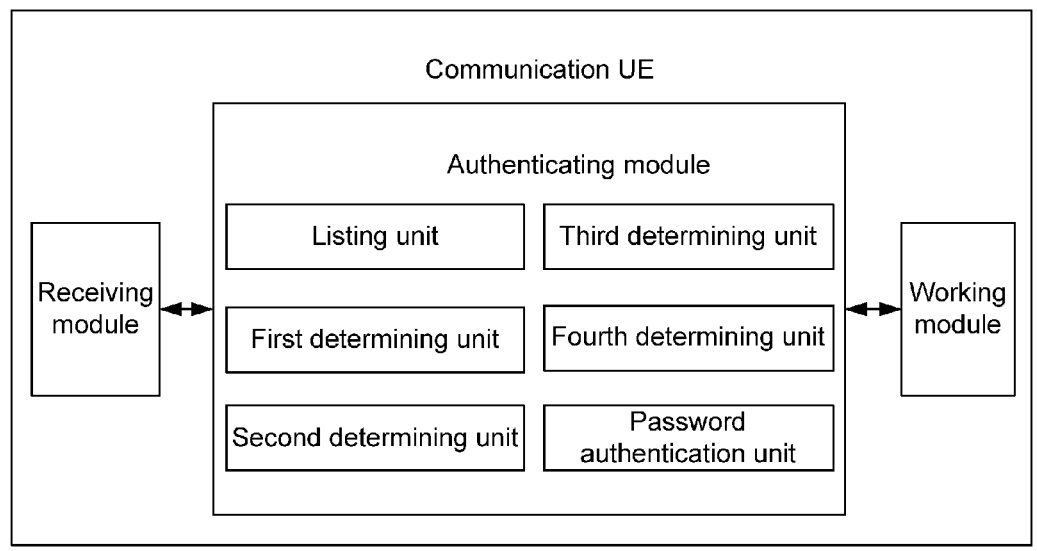
FIG. 2 is a schematic diagram of a structure of a communication UE according to an embodiment herein.

Referring to FIG. 1 and FIG. 2, a communication system herein mainly may include a communication UE with a WiFi function and at least one mobile UE with a WiFi function. The communication UE in the embodiment mainly may include a receiving module and an authenticating module. The receiving module receives a WiFi authentication request sent by a mobile UE requesting access. The WiFi authentication request may include unique identification information for identifying the current user of the mobile UE requesting access. The authenticating module may be configured for performing authentication on a user according to a received WiFi authentication request. The communication UE in the embodiment may further include a working module. The working module may be configured for establishing connection with a mobile UE after the mobile UE is authenticated to access the communication UE.

The authenticating module may further include: a listing unit, a first determining unit, a second determining unit, a third determining unit, a fourth determining unit, and a password authentication unit. The listing unit may save unique identification information for identifying any user authorized to access the communication UE. The four determining units may be configured for performing further determination on data in the authenticating unit. The password authentication unit may be configured for performing password authentication on a mobile UE requesting access for further user security. A method for authorization management provided herein is elaborated below with reference to functions of the modules in the communication UE and of the units in the authenticating module.

Figure 3:
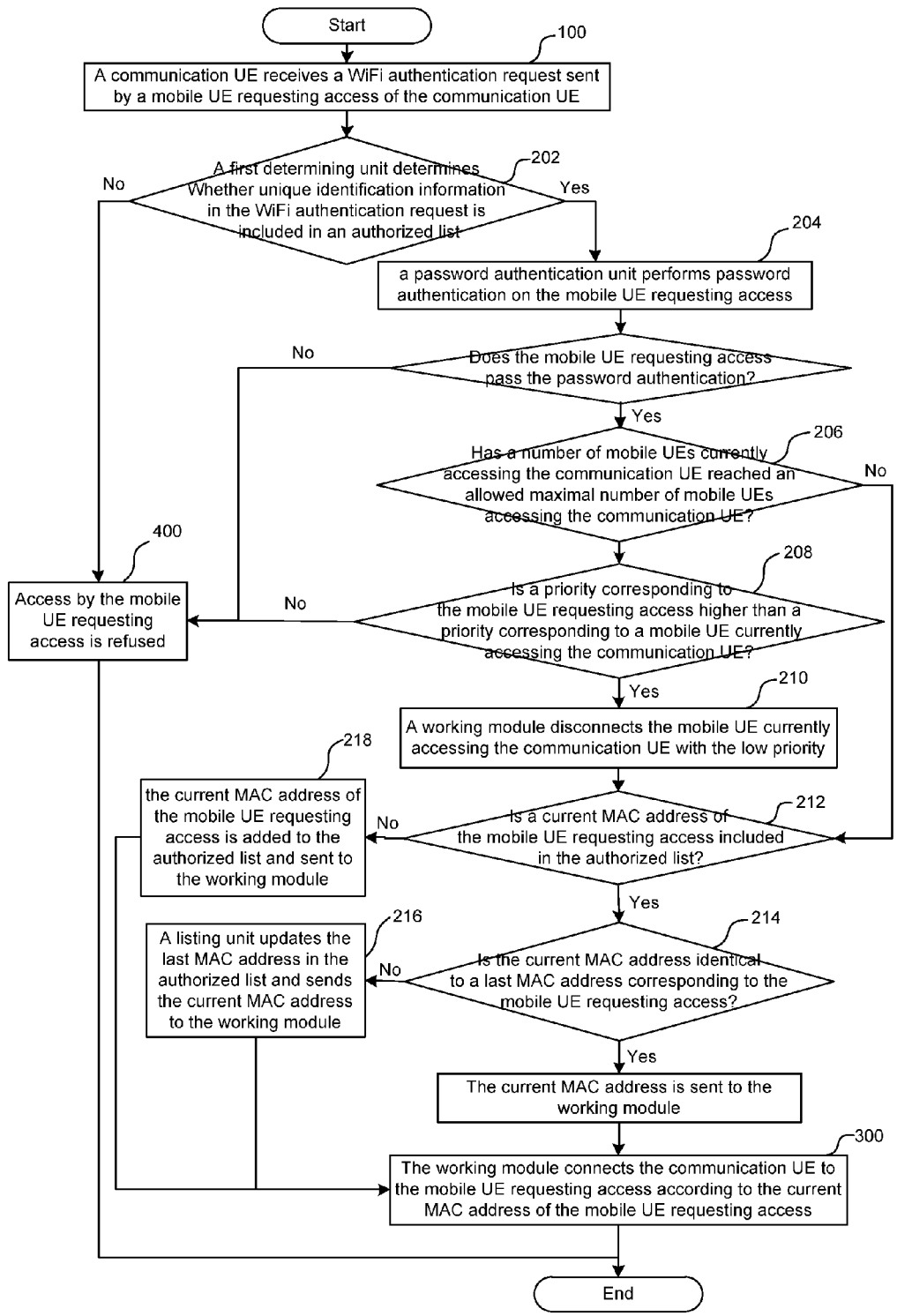
FIG. 3 is a flowchart of a method for authorization management according to an embodiment herein.

Referring to FIG. 3, the method for authorization management herein may include steps as follows.

In Step 100, a communication UE receives a WiFi authentication request sent by a mobile UE requesting access of the communication UE; the flow then goes to Step 200.

In step 100, a receiving module in the communication UE may be configured for receiving the WiFi authentication request, and forwarding the received WiFi authentication request to an authenticating module for processing. The received WiFi authentication request may include unique identification information for identifying the current user of the mobile UE requesting access. The WiFi authentication request sent by the mobile UE requesting access may further include a current MAC address of the mobile UE requesting access. The current MAC address may or may not be sent together with the WiFi authentication request. The current MAC address of the mobile UE requesting access may be sent any time before the connection is formally established, or be sent after the WiFi authentication request is authenticated successfully by the communication UE.

In Step 200, the communication UE authenticates the mobile UE requesting access according to the WiFi authentication request and an authorized list.

In Step 200, the authenticating module may authenticate the mobile UE requesting access. The authorized list saved by a listing unit may include unique identification information for identifying a mobile UE user authorized to access the communication UE. The unique identification information for identifying a mobile UE user saved in the authorized list may be of various types, and may be chosen as related information in an address book of the communication UE, such as a card number of a SIM card or a USIM card in the mobile UE requesting access, an Email account bound to a mobile UE of the user, or other information capable of uniquely identifying the user.

The authenticating module may authenticate the mobile UE requesting access as follows.

In Step 202, a first determining unit determines whether unique identification information in the WiFi authentication request is included in the authorized list; when the unique identification information in the WiFi authentication request is included in the authorized list, the flow goes to Step 204; otherwise when the unique identification information in the WiFi authentication request is not included in the authorized list, the flow goes to Step 400.

In Step 202, the first determining unit may search the authorized list for a file of a type same as that of the unique identification information in the WiFi authentication request. For example, when the received WiFi authentication request contains a card number of a SIM card of the current user, the authorized list may be searched for a card number file of the same type to determine whether the card number of the SIM card of the current user is included in a saved record for users authorized to access the communication UE.

In Step 204, the password authentication unit performs password authentication on the mobile UE requesting access; the flow goes to Step 206 when the mobile UE requesting access passes the password authentication; otherwise when the mobile UE requesting access fails the password authentication, the flow goes to step 400.

In Step 204, a step of WPAPSK password authentication may be included for enhanced user security. In practice, the WPAPSK password authentication may be skipped as excellent security may be achieved with the unique identifier information.

In Step 206, the third determining unit determines whether a number of mobile UEs currently accessing the communication UE has reached an allowed maximal number of mobile UEs accessing the communication UE; when the number of mobile UEs currently accessing the communication UE has reached the allowed maximal number, an On command may be sent to the fourth determining unit, and the flow goes to Step 208; otherwise when the number of mobile UEs currently accessing the communication UE has not reached the allowed maximal number, the flow goes to Step 212.

The allowed maximal number of mobile UEs accessing the communication UE may be set, for example by a user, to avoid poor user experience due to excessive users accessing the communication UE at the same time.

In Step 208, the fourth determining unit is activated/turned on to determined whether a priority corresponding to the current user of the mobile UE requesting access is higher than a priority of a user of a mobile UE currently accessing the communication UE; when there is a mobile UE currently accessing the communication UE with a priority lower than the priority corresponding to the mobile UE requesting access, the flow goes to step 210; when there is no mobile UE currently accessing the communication UE with a priority lower than the priority corresponding to the mobile UE requesting access, the flow goes to Step 400.

Before Step 208, a priority for each user in the authorized list needs to be set, for example as follows. Contact information may be selected from the address book of the communication UE and imported to the authorized list. All the contact information may be imported in batches or once for all. Contact information may be manually added to the authorized list. Contact information in the authorized list may include a name of a contact and unique identification information of the contact. After contact information is included in the authorized list, a priority is to be set for each contact in the authorized list. A "high", "medium", or "low" priority may be set for a contact based on a user decision. A default priority may be set, as the medium priority, for example. There may be various ways to set a priority, which will not be elaborated herein.

Referring to Table 1, the authorized list may include various types of data, such as a card number of a SIM card of a user. The authorized list may include a card number of a SIM card or a USIM card of a user, a name of the user, a priority for accessing the communication UE by the user (access priority for short), a MAC address, etc.

TABLE 1

Authorized List

| (U) card number of SIM card | User Name | Access Priority | MAC Address |
|---|---|---|---|
| 136XXXXXXXX | Zhang X | Medium (default) | 00:11:11:11:11:11 |
| 189XXXXXXXX | Li X | High | |
| 186XXXXXXXX | Wang X | Low | |
| . . . | . . . | . . . | . . . |

In Step 210, the working module disconnects the mobile UE currently accessing the communication UE with the low priority, and the flow goes to Step 212.

In Step 210, a mobile UE currently accessing the communication UE with a low priority may be disconnected in various ways. A mobile UE currently accessing the communication UE with a low priority may be disconnected randomly. Alternatively, one of the mobile UEs currently accessing the communication UE with low priorities that has stayed connected for the longest time may be disconnected.

In Step 212, the second determining unit determines whether the current MAC address of the mobile UE requesting access is included in the authorized list; the flow goes to Step 300.

In Step 212, the authorized list saved by the listing unit may further include the last MAC address used in last accessing the communication UE by a user; when the current MAC address of the mobile UE requesting access is included in the authorized list, the flow goes to Step 214; otherwise when the current MAC address is not in the authorized list, the flow goes to Step 218.

In Step 214, it is determined whether the current MAC address is identical to the last MAC address corresponding to the current user of the mobile UE requesting access; when the current MAC address is identical to the last MAC address corresponding to the current user of the mobile UE requesting access, the current MAC address is sent to the working module, and the flow goes to Step 300; otherwise when the current MAC address is not identical to the last MAC address corresponding to the mobile UE requesting access, the flow goes to Step 216.

In Step 216, the listing unit updates, with the current MAC address, the last MAC address used by the current user in the authorized list; the current MAC address is sent to the working module; and then the flow goes to Step 300.

In Step 218, the listing unit adds the current MAC address of the mobile UE requesting access to the authorized list; the current MAC address is sent to the working module; and the flow goes to Step 300.

In Step 300, the working module connects the communication UE to the mobile UE requesting access according to the current MAC address of the mobile UE requesting access.

In Step 400, the connection is terminated.

Before Step 100, the method may further include: determining whether the communication UE turns on authorization management; when the communication UE turns on authorization management, the flow goes, to Step 100; otherwise when the authorization management function is off, the flow turns to normal authentication.

What described are merely embodiments herein and are not intended to limit the scope of the disclosure.

The invention claimed is:

1. A method for authorization management, comprising:
receiving, by a communication User Equipment (UE), a WiFi authentication request sent by a mobile UE requesting access of the communication UE, the WiFi authentication request comprising unique identification information for identifying a current user of the mobile UE requesting access, the communication UE being a WiFi hot spot; and
authenticating, by the communication UE, the mobile UE requesting access according to the WiFi authentication request and an authorized list, the authorized list comprising unique identification information for identifying a mobile UE user authorized to access the communication UE,
wherein the unique identification information of a user is a card number of a SIM card or a USIM card of the user, or an Email account bound to a mobile UE of the user,
wherein the method further comprises:
selecting contact information from an address book of the communication UE and importing the selected contact information to the authorized list, or adding contact information to the authorized list in a manual mode, the contact information comprising a name of a contact and unique identification information of the contact;
setting priorities in accessing the communication UE respectively for contacts in the authorized list,
wherein the method further comprises: after the communication UE authenticates the mobile UE requesting access according to the WiFi authentication request and the authorized list,
determining, by the communication UE, whether a number of mobile UEs currently accessing the communication UE has reached an allowed maximal number of mobile UEs accessing the communication UE;
when the number of mobile UEs currently accessing the communication UE has not reached the allowed maximal number of mobile UEs accessing the communication UE, connecting, by the communication UE, to the mobile UE requesting access according to a current Media Access Control (MAC) address of the mobile UE requesting access;
when the number of mobile UEs currently accessing the communication UE has reached the allowed maximal number of mobile UEs accessing the communication UE, determining, by the communication UE according to the priorities in accessing the communication UE respectively for the contacts in the authorized list, whether a priority corresponding to the mobile UE requesting access is higher than a priority corresponding to a mobile UE currently accessing the communication UE; when there is a mobile UE currently accessing the communication UE with a priority lower than the priority corresponding to the mobile UE requesting access, disconnecting the mobile UE currently accessing the communication UE with the low priority, and connecting to the mobile UE requesting access; when there is no mobile UE currently accessing the communication UE with a priority lower than the priority corresponding to the mobile UE requesting access, refusing access by the mobile UE requesting access.

2. The method according to claim 1, wherein the authenticating, by the communication UE, the mobile UE requesting access according to the WiFi authentication request and an authorized list comprises: determining, by the communication UE, whether the unique identification information in the WiFi authentication request is comprised in the authorized list, and determining that the mobile UE requesting access is authenticated for access when the unique identification information in the WiFi authentication request is comprised in the authorized list.

3. The method according to claim 1, wherein the WiFi authentication request further comprises the current MAC address of the mobile UE requesting access, and the method further comprises: after the mobile UE requesting access is authenticated for access, connecting, by the communication UE, to the mobile UE requesting access according to the current MAC address in the WiFi authentication request.

4. The method according to claim 3, wherein the authorized list of the communication UE further comprises a last MAC address used in last accessing the communication UE by a user; the connecting, by the communication UE, to the mobile UE requesting access according to the current MAC address in the WiFi authentication request comprises: determining whether the current MAC address of the mobile UE requesting access is comprised in the authorized list; when the current MAC address of the mobile UE requesting access is comprised in the authorized list and the current MAC address is identical to the last MAC address corresponding to the current user of the mobile UE requesting access, directly connecting to the mobile UE requesting access according to the current MAC address; when the current MAC address is not identical to the last MAC address, updating, with the current MAC address, the last MAC address used by the current user in the authorized list, and connecting to the mobile UE requesting access according to the current MAC address; when the current MAC address of the mobile UE requesting access is not comprised in the authorized list, adding the current MAC address of the mobile UE requesting access to the authorized list and connecting to the mobile UE requesting access according to the current MAC address.

5. The method according to claim 4, wherein the communication UE clears any MAC address corresponding to a mobile UE of a user in the authorized list when the communication UE turns on or off WiFi.

6. The method according to claim 1, further comprising: after the mobile UE requesting access is authenticated for access, and before connecting to the mobile UE requesting access, performing, by the communication UE, password authentication on the mobile UE requesting access.

7. A communication User Equipment (UE), the communication UE being a WiFi hot spot, comprising:
  at least one processor; and
  memory storing computer readable instructions executable by the at least one processor,
  wherein the at least one processor is configured for:
  receiving a WiFi authentication request sent by a mobile UE requesting access of the communication UE, the WiFi authentication request comprising unique identification information for identifying a current user of the mobile UE requesting access;
  authenticating the mobile UE requesting access according to the WiFi authentication request and an authorized list, the authorized list comprising unique identification information for identifying a mobile UE user authorized to access the communication UE,
  wherein the unique identification information of a user is a card number of a SIM card or a USIM card of the user, or an Email account bound to a mobile UE of the user,
  wherein the at least one processor is further configured for:
  selecting contact information from an address book of the communication UE and importing the selected contact information to the authorized list, or adding contact information to the authorized list in a manual mode, the contact information comprising a name of a contact and unique identification information of the contact;
  setting priorities in accessing the communication UE respectively for contacts in the authorized list,
  after the mobile UE requesting access is authenticated for access, determining whether a number of mobile UEs currently accessing the communication UE has reached an allowed maximal number of mobile UEs accessing the communication UE;
  when the number of mobile UEs currently accessing the communication UE has not reached the allowed maximal number of mobile UEs accessing the communication UE, connecting the communication UE to the mobile UE requesting access according to a current Media Access Control (MAC) address of the mobile UE requesting access;
  when the number of mobile UEs currently accessing the communication UE has reached the allowed maximal number of mobile UEs accessing the communication UE, determining, according to the priorities in accessing the communication UE respectively for the contacts in the authorized list, whether a priority corresponding to the mobile UE requesting access is higher than a priority corresponding to a mobile UE currently accessing the communication UE; when there is a mobile UE currently accessing the communication UE with a priority lower than the priority corresponding to the mobile UE requesting access, disconnecting the mobile UE currently accessing the communication UE with the low priority, and connecting the communication UE to the mobile UE requesting access; when there is no mobile UE currently accessing the communication UE with a priority lower than the priority corresponding to the mobile UE requesting access, refusing access by the mobile UE requesting access.

8. The communication UE according to claim 7, wherein the at least one processor is configured for: determining whether the unique identification information in the WiFi authentication request is comprised in the authorized list, and determining that the mobile UE requesting access is authenticated for access when the unique identification information in the WiFi authentication request is comprised in the authorized list.

9. The communication UE according to claim 7, wherein the WiFi authentication request further comprises the current MAC address of the mobile UE requesting access, and the at least one processor is further configured for: after the mobile UE requesting access has been authenticated for access, connecting the communication UE to the mobile UE requesting access according to the current MAC address in the WiFi authentication request.

10. The communication UE according to claim 9, wherein the authorized list of the communication UE further comprises a last MAC address used in last accessing the communication UE by a user; the at least one processor is configured for: determining whether the current MAC address of the mobile UE requesting access is comprised in the authorized list; when the current MAC address of the mobile UE requesting access is comprised in the authorized list and the current MAC address is identical to the last MAC address corresponding to the current user of the mobile UE requesting access, directly connecting the communication UE to the mobile UE requesting access according to the current MAC address; when the current MAC address is not identical to the last MAC address, updating, with the current MAC address, the last MAC address used by the current user in the authorized list, and connecting the communication UE to the mobile UE requesting access according to the current MAC address; when the current MAC address of the mobile UE requesting access is not comprised in the authorized list, adding the current MAC address of the mobile UE requesting access to the authorized list, and connecting the communication UE to the mobile UE requesting access according to the current MAC address.

11. The communication UE according to claim 10, wherein the at least one processor is further configured for clearing any MAC address corresponding to a mobile UE of a user in the authorized list when WiFi is turned on or off.

12. The communication UE according to claim 7, wherein the at least one processor is further configured for: after the mobile UE requesting access is authenticated for access, performing password authentication on the mobile UE requesting access.

13. A communication system, comprising at least one mobile User Equipment (UE) and a communication UE,
  wherein the mobile UE has a WiFi function, and requests accessing the communication UE by sending the communication UE a WiFi authentication request comprising unique identification information for identifying a current user of the mobile UE,
  wherein the communication UE is a WiFi hot spot comprising:
  at least one processor; and
  memory storing computer readable instructions executable by the at least one processor,
  wherein the at least one processor is configured for:
  receiving the WiFi authentication request sent by the mobile UE requesting access of the communication UE, the WiFi authentication request comprising the unique identification information for identifying the current user of the mobile UE requesting access;
  authenticating the mobile UE requesting access according to the WiFi authentication request and an authorized list, the authorized list comprising unique identification information for identifying a mobile UE user authorized to access the communication UE, wherein the unique identification information of a user is a card number of a SIM card or a USIM card of the user, or an Email account bound to a mobile UE of the user, wherein the at least one processor is further configured for:

selecting contact information from an address book of the communication UE and importing the selected contact information to the authorized list, or adding contact information to the authorized list in a manual mode, the contact information comprising a name of a contact and unique identification information of the contact;

setting priorities in accessing the communication UE respectively for contacts in the authorized list, after the mobile UE requesting access is authenticated for access, determining whether a number of mobile UEs currently accessing the communication UE has reached an allowed maximal number of mobile UEs accessing the communication UE;

when the number of mobile UEs currently accessing the communication UE has not reached the allowed maximal number of mobile UEs accessing the communication UE, connecting the communication UE to the mobile UE requesting access according to a current Media Access Control (MAC) address of the mobile UE requesting access;

when the number of mobile UEs currently accessing the communication UE has reached the allowed maximal number of mobile UEs accessing the communication UE, determining, according to the priorities in accessing the communication UE respectively for the contacts in the authorized list, whether a priority corresponding to the mobile UE requesting access is higher than a priority corresponding to a mobile UE currently accessing the communication UE; when there is a mobile UE currently accessing the communication UE with a priority lower than the priority corresponding to the mobile UE requesting access, disconnecting the mobile UE currently accessing the communication UE with the low priority, and connecting the communication UE to the mobile UE requesting access; when there is no mobile UE currently accessing the communication UE with a priority lower than the priority corresponding to the mobile UE requesting access, refusing access by the mobile UE requesting access.

* * * * *